March 16, 1948. H. V. ATWELL 2,438,029
METHOD OF EFFECTING CATALYTIC CONVERSIONS
Filed May 3, 1944
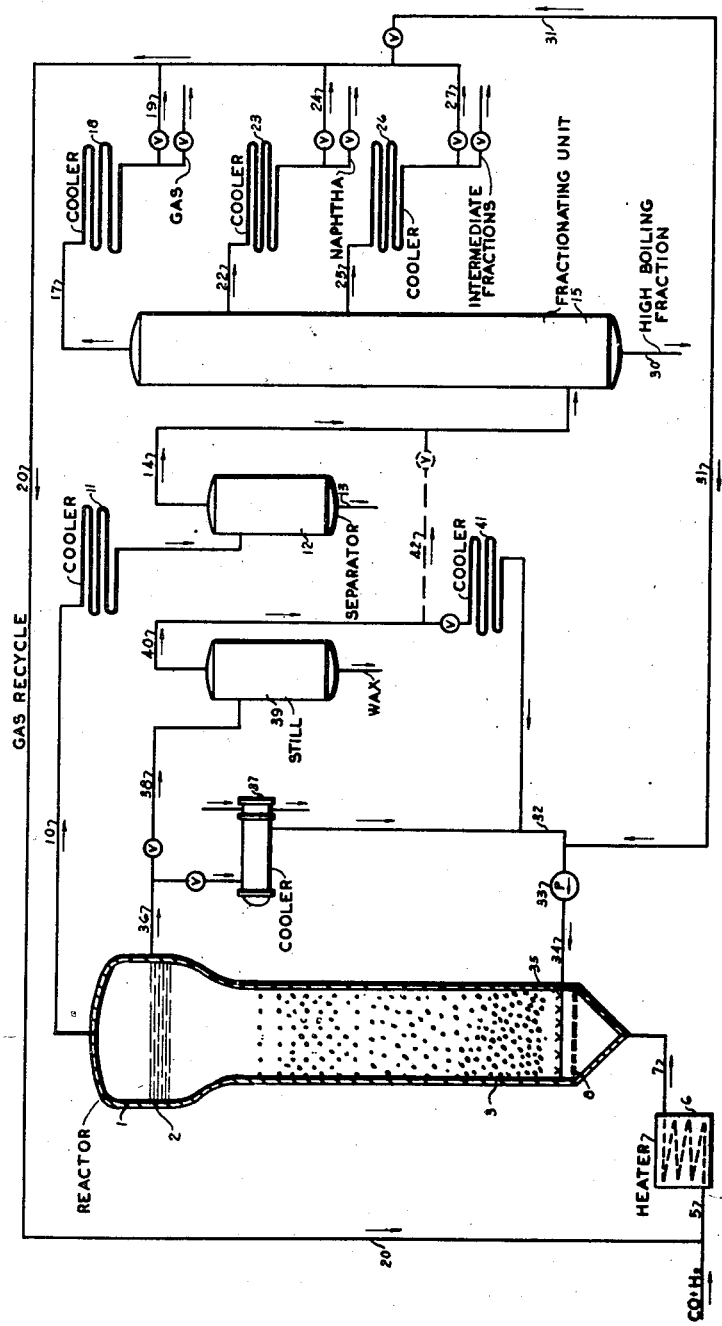
HAROLD V. ATWELL
INVENTOR
BY
HIS ATTORNEY Patented Mar. 16, 1948

2,438,029

UNITED STATES PATENT OFFICE 2,438,029

METHOD OF EFFECTING CATALYTIC CONVERSIONS

Harold V. Atwell, Beacon, N. Y., assignor, by mesne assignments, to The Texas Company, New York, N. Y., a corporation of Delaware Application May 3, 1944, Serial No. 533,900

3 Claims. (Cl. 23—1)

This invention relates to a method of effecting catalytic conversions, and particularly conversions which require control of the reaction temperature.

Broadly, the invention contemplates effecting conversion of gaseous reactants by passing them through a body of liquid in which the catalyst in solid finely divided form is suspended, provision being made for continuously adjusting the temperature of the liquid suspending medium outside the reaction zone while confining at least the bulk of the catalyst within the reaction zone.

The invention has particular application to reacting an oxide of carbon with hydrogen by the action of a solid hydrogenating catalyst so as to form normally liquid compounds having at least two carbon atoms per molecule, which reaction is of highly exothermic nature.

In accordance with the invention a column of liquid is maintained in a reaction tower. A substantial portion of this liquid column comprises catalyst particles, granules, or lumps which during operation are in the form of a suspension or slurry in the liquid. The reactant gases are dispersed in the bottom of the liquid column and rise therethrough undergoing reaction as they do so. A stream of this liquid is continuously drawn off from the upper portion of the liquid column, and either cooled or heated, as the case may be, and then returned to the lower portion of the liquid column. The liquid is thus continuously recycled through the reaction tower to provide a means for controlling the temperature of the reaction.

The unreacted gases, together with vaporous products of reaction, after rising through the liquid column are continuously removed from the top of the reaction tower.

The invention involves a number of advantages. Thus, the catalyst particles are maintained in a continual state of mobility during operation. At the same time the suspending liquid is subjected to turbulence. Consequently, as a result of the mobility of the catalyst particles and the continual movement of the liquid, uniform temperature conditions prevail throughout the catalyst mass.

Furthermore, the employment of the suspending liquid in the manner contemplated facilitates effective removal of heat either from or into the reaction zone. In addition, the invention permits employing the catalyst in relatively fine form while avoiding excessive resistance to flow of reactants through the reaction zone. The catalyst may be in the form of particles ranging from 10 to about 100 and preferably 20 to about 30 mesh.

The employment of the catalyst as a suspension of fine solid material in a liquid body also facilitates maintaining the reactant gases in a fine state of subdivision as the gases rise through the reaction zone.

In order to describe the invention reference will now be made to the accompanying drawing illustrating a method of flow for the reaction of carbon monoxide and hydrogen to produce hydrocarbons.

In the drawing the numeral 1 designates a reactor comprising a tower or vertical vessel, the upper portion of which is of enlarged cross-sectional area. The enlarged section provides a settling space, the purpose of which will be described later. The height of this enlarged section may be about 10% of the total reactor height.

A body of liquid 2 is maintained within the vessel as indicated, the surface of the liquid body being maintained in the enlarged section. This liquid comprises a higher boiling fraction of the product.

The solid particles of catalyst 3 are suspended, at least for the most part, in the portion of liquid confined within the lower portion of the vessel 1.

A catalyst useful for the hydrogenation of carbon monoxide to produce liquid hydrocarbons comprises either cobalt, iron or nickel, together with a promoter such as the oxides of thorium, magnesium, uranium, and vanadium, on a supporting material such as diatomaceous earth, silica gel, or Filtrols.

In operation a stream of carbon monoxide and hydrogen in the proportion of about 1 mol of carbon monoxide to 2 mols of hydrogen is drawn from a source not shown through a pipe 5 and passed through a heater or exchanger 6 wherein it is raised to a temperature of about 365 to 380° F.

The heated stream is introduced to the bottom of the reactor 1 through a pipe 7. A porous plate 8 is advantageously provided in the bottom of the reactor for the purpose of effecting uniform distribution of the gas so that the gaseous reactants will be uniformly dispersed in the bottom of the liquid column.

The dispersed gases rise through the mass of liquid and suspended catalyst towards the top of the reactor. After rising from the surface of the liquid the gaseous material, including unreacted carbon monoxide and hydrogen and vaporous hydrocarbon products of reaction, are continuously drawn off through a pipe 10 and cooler 11 to a drum 12.

In the drum 12 separation of some liquid, including water formed in the reaction, may occur, and the separated liquid is withdrawn through a pipe 13.

The uncondensed gas and hydrocarbons are continuously passed through a pipe 14 to a fractionating unit 15. The unit 15 is shown diagrammatically as a single tower but in practice may comprise two or more fractionating towers.

The fractionating unit is operated so as to separate the gasoline and heavier hydrocarbons from lighter gaseous materials.

Thus, the gases comprising unreacted carbon monoxide and hydrogen may be drawn off through a pipe 17 and cooler 18. All or a portion of the withdrawn gases may be conducted through a branch pipe 19 communicating with a pipe 20 through which the gas may be recycled to the reactor 1.

A naphtha hydrocarbon stream may be drawn off through a pipe 22 and cooler 23. If desired, a portion of the naphtha may be conducted through a branch pipe 24 communicating with the previously mentioned pipe 20 for recycling through the reaction.

Likewise, a still higher boiling fraction may be drawn off from a pipe 25 and cooler 26. A branch pipe 27 may also be provided through which this higher boiling fraction is recycled through pipe 20 to the reactor 1.

Still higher boiling hydrocarbons may be removed as a residual fraction through a pipe 30. The cooling liquid maintained in the reactor 1 advantageously comprises a fraction of the hydrocarbon product produced, for example, a fraction boiling in the range about 450 to 600° F. Such a fraction may be drawn off from the fractionating system through a pipe 31 which communicates with a pipe 32. A circulating pump 33 forces liquid from the pipe 32 through a pipe 34 into the lower portion of the reactor. Pipe 34 advantageously terminates in a suitable distributor 35 placed within the lower portion of reactor 1 as indicated.

The surplus cooling liquid collecting in the enlarged section of the reactor is continuously drawn off through a pipe 36 and passed through a cooler or heat exchanger 37 from which it is discharged into the pipe 32 for recycling through the reactor.

Condensation of products of reaction may occur to a substantial extent during the reaction within the reactor 1. In addition, hydrocarbon products including waxy material may be formed as a result of the reaction. Therefore the liquid continuously drawn off through the pipe 36 will include such liquid products. Therefore, provision may be made for continuously removing this excess liquid including waxy material. This can be accomplished by conducting a portion of the withdrawn liquid through a pipe 38 to a still 39 wherein the more volatile portion is separated as a distillate and removed through a pipe 40. From the pipe 40 the distillate may be conducted all or in part through a cooler 41 and then returned to the pipe 32 for recycling through the reactor 1. On the other hand, all or a portion of the distillate from the pipe 40 may be conducted through a branch pipe 42 which communicates with the pipe 14 and through which the distillate is passed to the fractionating unit 15.

Thus, the cooling liquid aids in preventing an accumulation of waxy material upon the catalyst particles, such waxy material being dissolved in the cooling liquid and removed from the reaction zone, thereby prolonging the active life of the catalyst.

The flow of reactant gases and of cooling liquid through the reaction vessel is unidirectional and is correlated so as to maintain the catalyst particles in the form of a suspension confined mainly within the lower portion of the column of liquid in the reactor 1. In the enlarged section the linear velocity of flow is substantially decreased so that catalyst particles settle back into the portion of the vessel of narrow cross-sectional area. In this way the catalyst mass is substantially entirely confined within the reaction vessel. The cooling liquid stream drawn off through the pipe 36 is substantially free of catalyst.

The volume of cooling liquid circulated and the temperature to which it is cooled prior to return to the reaction vessel may be controlled so that the temperature of the liquid in the upper portion of the reaction vessel will not exceed about 420 to 450° F. when operating with a cobalt catalyst.

It is desirable when operating to produce hydrocarbons to confine the reaction temperature within a fairly narrow range, namely, about 380 to 420° F. Where it is desired to produce oxygenated products, higher temperatures may prevail.

Part of the heat of reaction is carried out as sensible heat of the gases and hydrocarbons leaving the top of the reactor. Provision may be made for recycling a substantial amount of the unreacted gas and in that way facilitate temperature control. Hydrocarbon products may be recycled also. Thus the effluent reaction mixture may be recycled in substantial amount under conditions such that a relatively low conversion per pass is obtained.

While the use of a catalyst suspending liquid which is normally liquid under the conditions prevailing in an exothermic reaction has been described, nevertheless, it is contemplated that the liquid may comprise in part constituents which are vaporized under the reaction conditions prevailing so as to provide evaporative cooling in addition to that accomplished by circulating the cooling liquid.

Other types of liquids may be employed, such as, oxygenated organic compounds including alcohol, ethers, and esters, which are not completely vaporized under the conditions of operation.

While the invention has been described with reference to hydrogenating carbon monoxide, nevertheless, it is contemplated that the invention has application to other types of conversion reactions which are of an exothermic nature wherein it is desired to maintain the reaction zone within a predetermined range of temperature.

As already indicated the invention has application to reactions of endothermic nature in which case the catalyst suspending liquid is used to supply heat for the reaction. The exchanger 37 is then used to heat the circulating liquid.

Obviously many modifications and variations of the invention as above set forth may be made without departing from the spirit and scope thereof, and therefore only such limitations should be imposed as are indicated in the appended claims.

I claim:

1. A continuous method for effecting catalytic conversion of gaseous reactants by contact with a solid catalyst in particle form at predetermined temperature which comprises continuously passing a liquid upwardly through the particulate solid catalyst in an elongated vertical reaction zone so constructed and arranged that the velocity of flow of liquid through the upper section of the zone is relatively less than that through the lower section at a rate sufficient to disperse and agitate said catalyst particles in said liquid and less than that required to suspend the catalyst particles in said upper section, dispersing gaseous reactants into the lower portion of said zone effecting intimate contact between reactant gas and said catalyst at a temperature determined by said liquid such that substantial conversion of reactants occurs, discharging gases and vaporous products of reaction from the uppermost portion of said reaction zone, and continuously withdrawing said liquid substantially free from catalyst from said upper section of the reaction zone.

2. A continuous method for effecting exothermic catalytic conversion of gaseous reactants by contact with a solid catalyst in particle form at a temperature within a predetermined range which comprises continuously passing a cooling liquid upwardly through the particulate solid catalyst in an elongated vertical reaction zone so constructed and arranged that the velocity of flow of cooling liquid through the upper section of the zone is relatively less than that through the lower section at a rate sufficient to disperse and agitate said catalyst particles in said liquid and less than that required to suspend the catalyst particles in said upper section, dispersing gaseous reactants into the lower portion of said zone effecting intimate contact between reactant gas and said catalyst at a temperature determined by said liquid such that substantial conversion of reactants occurs, discharging gases and vaporous products of reaction from the uppermost portion of said reaction zone, and continuously withdrawing said cooling liquid substantially free from catalyst from said upper section of the reaction zone.

3. The processes as defined by claim 2 wherein said liquid is a liquid fraction of the reaction products.

HAROLD V. ATWELL.

REFERENCES CITED

The following references are of record in the file of this patent:

UNITED STATES PATENTS

| Number | Name | Date |
| --- | --- | --- |
| 1,355,105 | Canon | Oct. 5, 1920 |
| 2,159,077 | Duftschmidt | May 23, 1939 |
| 2,161,974 | Peck | June 13, 1939 |
| 2,318,602 | Duftschmidt | May 11, 1943 |
| 2,347,682 | Gunness | May 2, 1944 |
| 2,361,997 | Dreyfus | Nov. 7, 1944 |